(12) United States Patent
Stasiak et al.

(10) Patent No.: US 12,179,421 B2
(45) Date of Patent: Dec. 31, 2024

(54) THREE-DIMENSIONAL PRINTING

(71) Applicant: Hewlett-Packard Development Company, L.P., Spring, TX (US)

(72) Inventors: James W. Stasiak, Corvallis, OR (US); Garry D. Hinch, Corvallis, OR (US); Timothy L. Weber, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 409 days.

(21) Appl. No.: 17/288,554

(22) PCT Filed: Apr. 27, 2019

(86) PCT No.: PCT/US2019/029538
§ 371 (c)(1),
(2) Date: Apr. 25, 2021

(87) PCT Pub. No.: WO2020/222725
PCT Pub. Date: Nov. 5, 2020

(65) Prior Publication Data
US 2022/0040764 A1 Feb. 10, 2022

(51) Int. Cl.
*B29C 64/165* (2017.01)
*B22F 1/0545* (2022.01)
(Continued)

(52) U.S. Cl.
CPC .......... *B29C 64/165* (2017.08); *B22F 1/0545* (2022.01); *B22F 1/105* (2022.01);
(Continued)

(58) Field of Classification Search
CPC ........................... B22F 10/14; B22F 10/60–64
See application file for complete search history.

(56) References Cited

U.S. PATENT DOCUMENTS 6,814,926 B2 * 11/2004 Geving ................. B33Y 10/00
419/10
8,220,911 B2 7/2012 Nakano
(Continued)

FOREIGN PATENT DOCUMENTS

| CN | 108941534 | 12/2018 |
|---|---|---|
| WO | WO-2016196382 | 12/2016 |

(Continued)

OTHER PUBLICATIONS

Metal Supermarkets; "What is Case Hardening"; retrieved from internet on May 3, 2024; https://www.metalsupermarkets.com/what-is-case-hardening/ (Year: 2024).*

(Continued)

*Primary Examiner* — Alexandra M Moore
*Assistant Examiner* — Austin Pollock
(74) *Attorney, Agent, or Firm* — Dierker & Kavanaugh, P.C.

(57) ABSTRACT

In an example three-dimensional printing method, individual layers of a metal-based build material are patterned, based on a 3D object model, with a binding agent to form an intermediate structure. A case-hardened portion of a 3D object is also patterned (based on the object model) by selectively depositing a hardening agent to deliver a predetermined concentration of a hardening element to at least one of the individual layers, wherein the individual layers are maintained below a vaporization temperature of the hardening agent during the selectively depositing. The intermediate structure is heated at a first rate to a temperature that aids in diffusion of the hardening element, and is held at the temperature for a predetermined time. The intermediate structure is cooled at a second rate. The intermediate structure, with the patterned case-hardened portion, is then sin- (Continued)

tered at a sintering temperature of the metal-based build material.

9 Claims, 3 Drawing Sheets

(51) Int. Cl.

| | |
|---|---|
| *B22F 1/105* | (2022.01) |
| *B22F 3/10* | (2006.01) |
| *B22F 10/14* | (2021.01) |
| *B22F 10/64* | (2021.01) |
| *B22F 12/13* | (2021.01) |
| *B22F 12/17* | (2021.01) |
| *B22F 12/53* | (2021.01) |
| *B29C 64/209* | (2017.01) |
| *B29C 64/245* | (2017.01) |
| *B29C 64/295* | (2017.01) |
| *B29C 64/371* | (2017.01) |
| *B33Y 10/00* | (2015.01) |
| *B33Y 40/20* | (2020.01) |
| *B33Y 70/10* | (2020.01) |
| *C08K 3/38* | (2006.01) |
| *C08L 101/00* | (2006.01) |

(52) U.S. Cl.
CPC ............ *B22F 3/1021* (2013.01); *B22F 10/14* (2021.01); *B22F 10/64* (2021.01); *B29C 64/209* (2017.08); *B29C 64/245* (2017.08); *B29C 64/295* (2017.08); *B29C 64/371* (2017.08); *B33Y 10/00* (2014.12); *B33Y 40/20* (2020.01); *B33Y 70/10* (2020.01); *C08K 3/38* (2013.01); *C08L 101/00* (2013.01); *B22F 12/13* (2021.01); *B22F 12/17* (2021.01); *B22F 12/53* (2021.01); *B22F 2301/205* (2013.01); *B22F 2301/255* (2013.01); *B22F 2301/35* (2013.01); *B29K 2995/0094* (2013.01); *C08K 2003/385* (2013.01)

(56) References Cited

U.S. PATENT DOCUMENTS

| | | | |
|---|---|---|---|
| 8,951,402 B2 | 2/2015 | Timur et al. | |
| 9,695,089 B2 | 7/2017 | Lynen et al. | |
| 10,040,216 B2 * | 8/2018 | Bai | B22F 10/14 |
| 2016/0256925 A1 | 9/2016 | Heikkila | |
| 2017/0080497 A1 * | 3/2017 | Tuffile | B22F 10/14 |
| 2018/0126515 A1 * | 5/2018 | Franke | C22C 32/0031 |
| 2018/0236545 A1 * | 8/2018 | Trump | B33Y 70/00 |
| 2018/0237648 A1 * | 8/2018 | Barbati | B33Y 80/00 |
| 2018/0305266 A1 * | 10/2018 | Gibson | B33Y 40/20 |
| 2018/0311728 A1 * | 11/2018 | Kottilingam | B22F 10/14 |
| 2020/0016725 A1 | 1/2020 | Adefris et al. | |
| 2020/0062877 A1 | 2/2020 | Knopf et al. | |
| 2021/0291274 A1 * | 9/2021 | Sercombe | B22F 10/14 |
| 2021/0331242 A1 * | 10/2021 | Barbati | B28B 1/001 |

FOREIGN PATENT DOCUMENTS

| | | | | |
|---|---|---|---|---|
| WO | WO-2017131760 A1 * | 8/2017 | ............. | B22F 10/10 |
| WO | WO-2017181054 A1 | 10/2017 | | |
| WO | WO-2018017130 A1 | 1/2018 | | |
| WO | 2018/193306 A2 | 10/2018 | | |
| WO | WO-2019017926 A1 | 1/2019 | | |
| WO | 2019/025801 A1 | 2/2019 | | |
| WO | WO-2019079497 A1 * | 4/2019 | ............ | B22F 1/0059 |

OTHER PUBLICATIONS

Enrique, P. D., et al., "In situ formation of metal matrix composites using binder jet additive manufacturing (3D printing)", Materials Letters, Elsevier, Amsterdam, NL, vol. 232, Aug. 23, 2018, pp. 179-182.

Matuschka, A., "Boronizing," Heyden Publications, Philadelphia, PA, 1980.

Afolabi, Ayo S. et al., "Controlled Surface Treatment of Mild Steel with Carbon Nanotubes at Austenitic Temperature", WCECS 2015 vol. II, 5 pages.

Costa, H. et al. "Some Innovative Surface Texturing Techniques for Tribological Purposes"; Jun. 19, 2014; Part J: Journal of Engineering Tribology, 86 pages.

Srivastava, V. K. ; "A Review on Advances in Rapid Prototype 3D Printing of Multi-Functional Applications", Science and Technology 2017, 7(1): 4-24, 15 pgs.

"Boriding—Boronizing—DHB—Thermo-Chemical Surface Hardening Process", IBC Coatings Technologies, Inc., ibccoatings.com/boriding-boronizing-dhb, retrieved Jun. 29, 20, 3 pgs.

Boriding—an overview | ScienceDirect Topics, 2020, 16 pages, https://www-sciencedirect-com.ezproxy-pa1.labs.hp.com/topics/engineering/boriding.

Mebarek, B. et al.; "Effect of Boride Incubation Time During the Formation of Fe2B Phase" Mat Research, 2018, 21(1), 7pgs (http://dx.doi.org/10.1590/1980-5373-MR-2017-0647).

Rabeeh, B., "Ultra-Fast Boriding and Surface Hardening of Low Carbon Steel", TMS (The Minerals, Metals, and Materials Soc.) Ann. Meeting, 2015, 1499-1506.

\* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
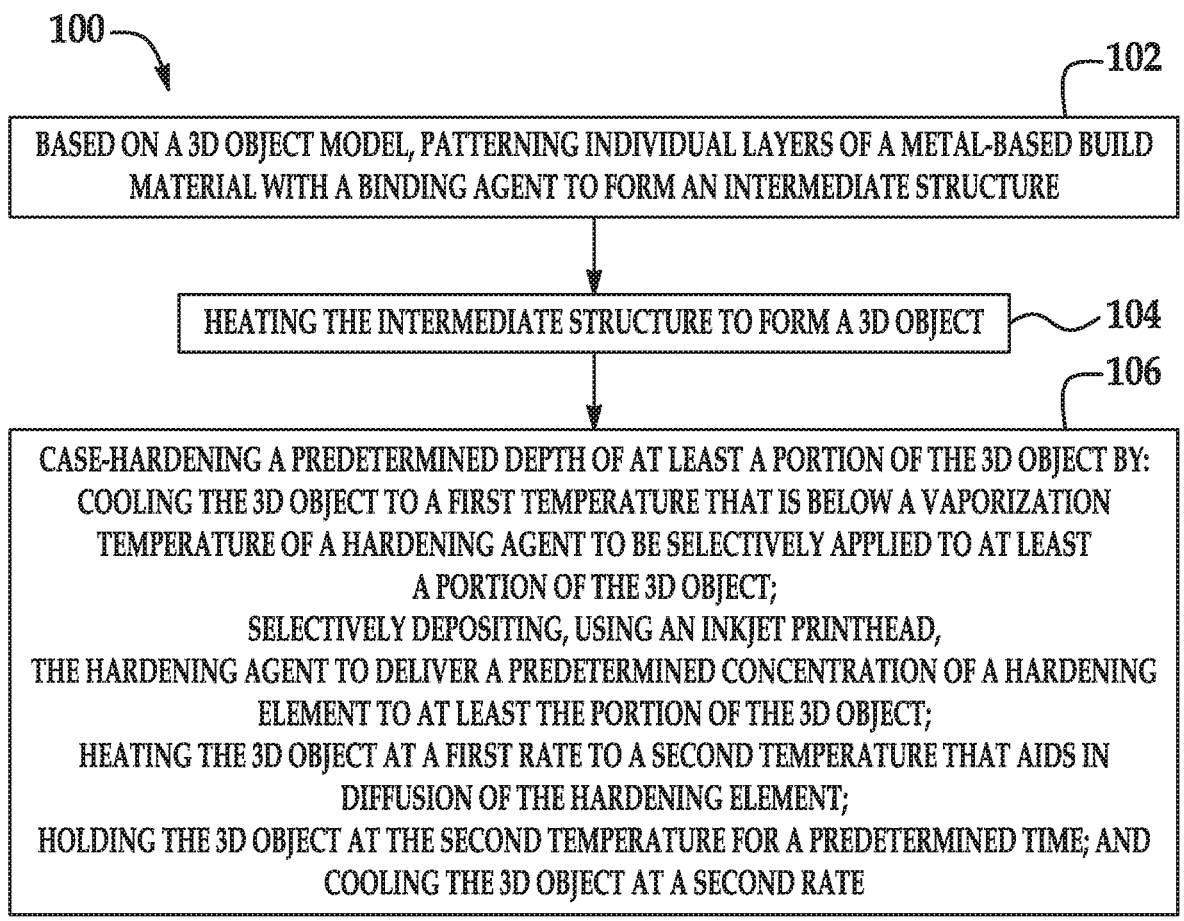
FIG. 1 is a flow diagram illustrating an example method of three-dimensional printing in accordance with the present disclosure.

In some examples of three-dimensional (3D) printing, a binder fluid is selectively applied to a layer of build material on a build platform, thereby patterning a selected region of the layer, and then another layer of the build material is applied thereon. The binder fluid is then selectively applied to this other layer, and these processes may be repeated to form a green part (referred to herein as an "intermediate structure") of a 3D part/object that is ultimately to be formed. The binder fluid may be capable of penetrating the layer of the build material onto which it is applied, and/or spreading around an exterior surface of the build material and filling void spaces between particles of the build material. The binder fluid can include binder particles, such as polymer latex particles, that when cured, temporarily hold the build material of the 3D intermediate structure together. The 3D intermediate structure may be moved from the build platform to a separate device for heating to remove the binder particles and to sinter the build material particles of the patterned intermediate structure to form the 3D part/object.

The examples disclosed herein introduce digitally-controlled case-hardening into this binder fluid based 3D printing process. Hardening agents may be selectively applied, using an inkjet printhead, to the intermediate structure as it is being built or after it is built, or to the final 3D part/object. Selective application of the hardening agent by digital inkjet printing methods enables the hardness to be engineered spatially and volumetrically at the voxel-scale. Moreover, heating and cooling rates, temperature hold time, and the concentration of the hardening element(s) that are delivered may be controlled so that the hardening element(s) penetrate(s) into the intermediate structure or into the final 3D part/object to a predetermined case-depth. The methods disclosed herein enable predictable, systematic, and reproducible surface hardening of 3D printed metal objects.

The methods disclosed herein utilize inkjet compatible hardening agent(s) and binder fluid(s), as well as metal-based build materials. By "inkjet compatible," it is meant that the hardening agent or binder fluid can be ejected from a thermal inkjet printhead, a piezoelectric inkjet printhead, or both types of printheads. The printheads may be drop-on-demand inkjet printheads or continuous inkjet printheads.

The hardening agent, the binder fluid, and the metal-based build material may be part of a three-dimensional printing kit. In an example, the three-dimensional printing kit includes a metal-based build material; a binder agent; and a hardening agent including a vehicle and a hardening element. In another example, the three-dimensional printing kit includes a metal-based build material selected from the group consisting of a stainless steel and titanium; a binder agent; and a hardening agent including a vehicle and a hardening element, wherein one of: the metal-based build material is a stainless steel, and the hardening element is selected from the group consisting of carbon, molybdenum, tungsten, copper, and boron; or the metal-based build material is titanium, and the hardening element is gold.

Throughout this disclosure, a weight percentage that is referred to as "wt % active" refers to the loading of an active component of a dispersion or other formulation that is present in the hardening agent, binder fluid, and/or build material composition. For example, a hardening element, such as carbon nanoparticles, may be present in a water-based formulation (e.g., a stock solution or dispersion) before being incorporated into the hardening agent. In this example, the wt % actives of the carbon nanoparticles accounts for the loading (as a weight percent) of the carbon nanoparticle solids that are present in the hardening agent, and does not account for the weight of the other components (e.g., water, etc.) that are present in the stock solution or dispersion with the carbon nanoparticles. The term "wt %," without the term actives, refers to either i) the loading of a 100% active component that does not include other non-active components therein, or ii) the loading of a material or component that is used "as is" and thus the wt % accounts for both active and non-active components.

Hardening Agent

Examples of the hardening agent include a hardening element and a vehicle.

The hardening element may be any element that can be dissolved or dispersed into the vehicle to generate a jettable fluid and that can case-harden a metal-based build material. Examples of suitable hardening elements include carbon, molybdenum, tungsten, copper, boron, gold, chromium, or combinations thereof. The carbon hardening elements may be in the form of carbon nanoparticles, carbon black nanoparticles, carbon nanotubes or graphene. The molybdenum or tungsten hardening elements may be in the form, respectively, of a molybdate (e.g., ammonium molybdate or sodium molybdate) or a tungstate (e.g., ammonium tungstate or sodium tungstate), or molybdenum- or tungsten-containing organometallics, or as molybdenum or tungsten nanoparticles. Copper and gold may be in the form of nanoparticles. The boron hardening element may be in the form of borate (e.g., sodium borate or another water soluble borate species) or boron nanoparticles. The chromium hardening element may be in the form of a salt containing chromium in an oxidized state (e.g., chromate salt), or nanoparticles, or an organometallic source of chromium (e.g., chromium hexacarbonyl or (benzene)chromium tricarbonyl).

Any of the hardening elements that are included as nanoparticles may have a particle size (e.g., mean diameter, which may be calculated using a number distribution, volume distribution, etc.) ranging from about 2 nm to about 100 nm. In another example, the hardening element nanoparticles may have a particle size ranging from about 10 nm to about 50 nm. The longest dimension of a carbon nanotube used as a hardening element (e.g., its length) may range from about 2 nm to about 100 nm.

The hardening element may be present in the hardening agent in an amount that enables good jettability from a desired inkjet printhead. When carbon nanoparticles or nanotubes are included in the hardening agent, the amount may range from about 0.5 wt % to about 5.5 wt %, based on the total weight of the hardening agent. In one example, carbon nanoparticles may be present in the hardening agent in an amount of about 5 wt %. When metal salts (e.g., molybdate, tungstates, borates, or chromates) are included in the hardening agent, the amount may range from about 1 wt % to about 20 wt %, based on the total weight of the hardening agent.

The hardening agent also includes a vehicle. By "vehicle," it is meant that the liquid(s) into which the hardening element is introduced. In an example, the vehicle may include at least some water (e.g., deionized water). The amount of water may depend, in part, on the type of jetting architecture that is to be used. For example, if the hardening agent is to be jettable via thermal inkjet printing, water may make up 35 wt % or more of the hardening agent. In one example, water makes up from about 71 wt % to about 73 wt % of the total weight of the hardening agent. For another example, if the hardening agent is to be jettable via piezoelectric inkjet printing, water may make up from about 25 wt % to about 30 wt % of the hardening agent, and 35 wt % or more of the conductive agent may be an organic co-solvent, such as ethanol, isopropanol, acetone, etc. Other example vehicles include no water and include one or more of the co-solvents disclosed herein.

In addition to water, any example of the vehicle may include a co-solvent and a surfactant. Other additives may also be included, such as antimicrobial agent(s), dispersant(s), chelating agent(s), and/or combinations thereof. In an example, the vehicle of the hardening agent includes a co-solvent, a surfactant, and a balance of water. In another example, the vehicle of the hardening agent consists of a co-solvent, a surfactant, and a balance of water. In still another example, the vehicle of the hardening agent consists of a co-solvent, a surfactant, an additive selected from the group consisting of antimicrobial agent(s), dispersant(s), chelating agent(s), and/or combinations thereof, and a balance of water.

Classes of organic co-solvents that may be used in the hardening agent include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Some examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the hardening agent in a total amount ranging from about 1 wt % to about 50 wt % based upon the total weight of the conductive agent, depending upon the jetting architecture of the applicator. In an example, the total amount of the co-solvent(s) present in the hardening agent is about 5 wt % based on the total weight of the conductive agent. In another example, the total amount of the co-solvent(s) present in the conductive agent is about 20 wt % based on the total weight of the conductive agent.

In some examples, the vehicle of the hardening agent includes surfactant(s) to improve the jettability of the hardening agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the hardening agent may range from about 0.01 wt % active to about 1 wt % active based on the total weight of the hardening agent. In an example, the total amount of surfactant(s) in the hardening agent may be about 0.75 wt % active based on the total weight of the hardening agent.

In some examples, the vehicle of the hardening agent includes dispersant(s). Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the hardening agent may range from about 1 wt % active to about 10 wt % active based on the total weight of the hardening agent. In an example, the total amount of dispersant(s) in the hardening agent may be about 0.75 wt % active based on the total weight of the hardening agent.

Chelating agents (or sequestering agents) may be included in the vehicle of the hardening agent to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the hardening agent may range from greater than 0 wt % active to about 1 wt % active based on the total weight of the hardening agent. In an example, the chelating agent(s) is/are present in the hardening agent in an amount of about 0.08 wt % active (based on the total weight of the hardening agent).

Binder Fluid

The binder fluid is a fluid that includes water and polymer particles that are effective for binding layers of particulate build material when forming a 3D intermediate structure.

In some examples, the polymer particles are latex particles. Latex particles refer to any polymer (homopolymer, co-polymer, or heteropolymer) that is capable of being dispersed in an aqueous medium.

The polymer (latex) particles may have several different morphologies. In one example, the polymer particles can include two different copolymer compositions, which may be fully separated core-shell polymers, partially occluded mixtures, or intimately comingled as a polymer solution. In another example, the polymer particles can be individual spherical particles containing polymer compositions of hydrophilic (hard) component(s) and/or hydrophobic (soft) component(s) that can be interdispersed. In one example, the interdispersion can be according to IPN (interpenetrating networks) although it is contemplated that the hydrophilic and hydrophobic components may be interdispersed in other ways. In yet another example, the polymer particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the polymer particles can include 2, 3, or 4 or more relatively large polymer particles that can be attached to one another or can surround a smaller polymer core. In a further example, the polymer particles can have a single phase morphology that can be partially occluded, can be multiple-lobed, or can include any combination of any of the morphologies disclosed herein.

In some examples, the polymer particles can be homopolymers. In other examples, the polymer particles can be heteropolymers or copolymers. In an example, a heteropolymer can include a hydrophobic component and a hydrophilic component. In this example, the heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

Examples of monomers that may be used to form the hydrophobic component of the heteropolymer polymer (latex) particles include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific example monomers can include, C1 to C20 linear or branched alkyl (meth)acrylate, alicyclic (meth)acrylate, alkyl acrylate, styrene, methyl styrene, polyol (meth)acrylate, hydroxyethyl (meth)acrylate, or a combination thereof. In one specific class of examples, the polymer (latex) particles can be a styrene (meth)acrylate copolymer. In still another example, the polymer (latex) particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder fluid, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

In still other examples, the polymer (latex) particles in the binder fluid include polymerized monomers of vinyl chloride, vinylidene chloride, vinylbenzyl chloride, vinyl ester, styrene, ethylene, maleate esters, fumarate esters, itaconate esters, α-methyl styrene, p-methyl styrene, methyl methacrylate, hexyl acrylate, hexyl methacrylate, hydroxyethyl acrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, 2-phenoxyethyl methacrylate, isobornyl acrylate, tetrahydrofurfuryl acrylate, benzyl methacrylate, benzyl acrylate, ethoxylated nonyl phenol methacrylate, isobornyl methacrylate, ethylene glycol dimethacrylate, diethylene glycol dimethacrylate, triethylene glycol dimethacrylate, cyclohexyl methacrylate, trimethyl cyclohexyl methacrylate, t-butyl methacrylate, n-octyl methacrylate, lauryl acrylate, lauryl methacrylate, trydecyl methacrylate, alkoxylated tetrahydrofurfuryl acrylate, isodecyl acrylate, dimethyl maleate, dioctyl maleate, acetoacetoxyethyl methacrylate, diacetone acrylamide, N-vinyl imidazole, N-vinylcarbazole, N-Vinylcaprolactam, pentaerythritol tri-acrylate, pentaerythritol tetra-acrylate, pentaerythritol tri-methacrylate, pentaerythritol tetra-methacrylate, glycidol acrylate, glycidol methacrylate, tetrahydrofuryl acrylate, tetrahydrofuryl methacrylate, diacetone acrylamide, t-butyl acrylamide, divinylbenzene, 1,3-butadiene, acrylonitrile, methacrylonitrile, combinations thereof, derivatives thereof, or mixtures thereof. These monomers include low glass transition temperature (Tg) monomers that can be used to form the hydrophobic component of a heteropolymer.

In some examples, a composition of the polymer (latex) particles can include acidic monomer(s). In some examples, the acidic monomer content can range from 0.1 wt % to 5 wt %, from 0.5 wt % to 4 wt %, or from 1 wt % to 2.5 wt % of the polymer particles with the remainder of the polymer particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

Any suitable polymerization process can be used to form the polymer particles. In some examples, an aqueous dispersion of latex particles can be produced by emulsion polymerization or co-polymerization of any of the above monomers.

In one example, the polymer (latex) particles can be prepared by polymerizing high Tg hydrophilic monomers to form the high Tg hydrophilic component and attaching the high Tg hydrophilic component onto the surface of the low Tg hydrophobic component. In another example, the polymer (latex) particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the polymer (latex) particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the polymer (latex) particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the polymer (latex) polymer can have a weight average molecular weight (Mw, g/mol) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the polymer (latex) particles can be latent and can be activated by heat (which may be applied iteratively during 3D intermediate structure formation or after 3D intermediate structure formation). In these instances, the activation temperature can correspond to the minimum film formation temperature (MFFT) or a glass transition temperature ($T_g$) which can be greater than ambient temperature. As mentioned herein, "ambient temperature" may refer to room temperature (e.g., ranging about 18° C. to about 22° C.). In one example, the polymer (latex) particles can have a MFFT or $T_g$ that can be at least about 15° C. greater than ambient temperature. In another example, the MFFT or the $T_g$ of the bulk material (e.g., the more hydrophobic portion) of the polymer (latex) particles can range from about 25° C. to about 200° C. In another example, the polymer (latex) particles can have a MFFT or $T_g$ ranging from about 40° C. to about 120° C. In yet another example, the polymer (latex) particles can have a MFFT or $T_g$ ranging from about 0° C. to about 150° C. In a further example, the polymer latex particles can have a $T_g$ that can range from about −20° C. to about 130° C., or in another example from about 60° C. to about 105° C. At a temperature above the MFFT or the $T_g$ of a latent latex polymer particle, the polymer particles can coalesce and can bind materials, such as the metal-based build material particles.

The polymer (latex) particles can have a particle size that can be jetted via thermal ejection or printing, piezoelectric ejection or printing, drop-on-demand ejection or printing, continuous ejection or printing, etc. In an example, the particle size (volume-weight mean diameter) of the polymer (latex) particles can range from about 1 nm to about 400 nm. In yet other examples, a particle size of the polymer particles can range from about 10 nm to about 300 nm, from about 50 nm to about 250 nm, from about 100 nm to about 250 nm, or from about 25 nm to about 250 nm. In some examples, the polymer particles can have a particle size that can be jetted via thermal ejection or printing, piezoelectric ejection or printing, drop-on-demand ejection or printing, continuous ejection or printing, etc. In these examples, the particle size of the polymer particles be about 100 nm or more.

In some examples, the polymer (latex) particles have a glass transition temperature higher than 60° C. and an average particle size of 1 nm or more.

In examples of the binder fluid, the polymer particles can be present, based on a total weight of the binder fluid, in an amount ranging from about 1 wt % active to about 40 wt % active. In other more detailed examples, the polymer particles can be present in an amount ranging from about 5 wt % active to about 30 wt % active, from about 12 wt % active to about 22 wt % active, from about 15 wt % active to about 20 wt % active, from about 10 wt % active to about 20 wt % active, or from about 6 wt % active to about 18 wt % active, based on the total weight of the binder fluid.

In addition to the polymer particles, the binder fluid includes a binder fluid vehicle. In one example, the binder fluid vehicle is water. In another example, the binder fluid vehicle includes water and one or more additives, such as co-solvent(s), surfactant(s) and/or dispersing agent(s), antimicrobial(s), viscosity modifier(s), pH adjuster(s), chelating agent(s), and the like. In one example, water can be present at from about 30 wt % to 100 wt % of the binder fluid vehicle component—excluding polymer particles—based on a total weight of the aqueous liquid vehicle. Put another way, the water can be present at from about 60 wt % to about 99 wt %, from about 65 wt % to 90 wt %, or from about 70 wt % to about 85 wt %, based on a total weight of the binder fluid.

The co-solvent can be present in the binder fluid in an amount ranging from about 0.5 wt % to about 50 wt %, based on a total weight of the binder fluid. In some examples, the binder fluid co-solvent can be a high boiling point solvent, which can have a boiling point of at least about 110° C. Any of the co-solvents described for the hardening agent may be used in the binder agent. Some specific examples include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidone, 2-methyl-1,3-propanediol (MP-diol), and combinations thereof.

Any examples of the surfactants set forth for the hardening agent may be used in the binder fluid. Some specific examples include SURFYNOL® SEF (a self-emulsifiable wetting agent based on acetylenic diol chemistry), SURFYNOL® 104 (a non-ionic wetting agent based on acetylenic diol chemistry), or SURFYNOL® 440 (an ethoxylated low-foam wetting agent) (all available from Evonik Degussa); TERGITOL® TMN-6 (a branched secondary alcohol ethoxylate, non-ionic surfactant), TERGITOL® 15-S-5 or TERGITOL® 15-S-7 (each of which is a secondary alcohol ethoxylate, non-ionic surfactant), or DOWFAX® 2A1 or DOWFAX® 8390 (each of which is an alkyldiphenyloxide disulfonate, available from The Dow Chemical Company); CAPSTONE® FS-35 (non-ionic fluorosurfactant from DuPont) or a combination thereof.

The surfactant or combinations of surfactants can be present in the binder fluid at from about 0.1 wt % active to about 5 wt % active in its respective fluid based on the total weight, and in some examples, can be present at from about 0.5 wt % active to about 2 wt % active.

With respect to antimicrobials, any compound set forth for the hardening agent can be included in the binder fluid. In an example, the example binder fluids may include a total amount of antimicrobials that ranges from about 0.0001 wt % active to about 1 wt % active.

Chelating agents, such as EDTA (ethylene diamine tetra acetic acid) or any other example set forth for the hardening agent may be included in the binder fluid. Whether a single chelating agent is used or a combination of chelating agents is used, the total amount of chelating agent(s) in the example binder fluids may range from greater than 0 wt % active to about 2 wt % active based on the total weight of the binder fluid and/or the separate adhesion promoter fluid.

Viscosity modifiers and buffers may also be present, as well as other additives to modify properties of the binder fluid.

In some binder fluid can also include from about 0.1 wt % to about 1 wt % of an anti-kogation agent, based on a total weight of the binder fluid. Kogation refers to the deposit of dried solids on a thermal inkjet printhead. An anti-kogation agent can be included to prevent the buildup of dried solids on the printhead. Examples of suitable anti-kogation agents can include oleth-3-phosphate (commercially available as CRODAFOS™ 03A or CRODAFOS™ N-3 acid), dextran 500k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Combined Hardening Agent and Binder Agent

The examples disclosed herein describe a hardening agent and a separate binder agent. Separate agents allow for the patterning of the 3D object (with the binder agent) and the patterning for the case-hardened portions of the 3D object to be separately controlled. However, it is to be understood that the hardening element (of the hardening agent) and the polymer particles (of the binder agent) may be combined into a single hardening/binder agent. The combined hardening/binder agent may include the hardening element, the polymer particles, and any example of the vehicle described herein for the hardening agent and/or the binder agent. This combined hardening/binder agent may be useful, for example, when it is desirable to case-harden throughout the 3D object, as described in reference to FIG. 4B. This combined hardening/binder agent may also be used with a separate binder agent in the method described in reference to FIG. 4A. In this example, the separate binder agent may be used to pattern portion(s) of the 3D object that are not to be case-hardened, and the combined hardening/binder agent may be used to pattern portion(s) of the 3D object that are to be case-hardened.

Metal-Based Build Materials

In the examples disclosed herein, the build material can include any metal-based build material. Metal-based build materials may be particles of a metal or a metal alloy.

In an example, the metal particles are a single phase metallic material composed of one element. In this example, the sintering temperature may be below the melting point of the single element. An example of these metal particles includes titanium. In another example, the metal particles are composed of two or more elements, which may be in the form of a single phase metallic alloy or a multiple phase metallic alloy. In these other examples, sintering generally occurs over a range of temperatures. Examples of these metal particles include low- to medium-carbon stainless steels, ferrous alloys, or titanium alloys. In low-carbon stainless steel, the carbon level is 0.3% or less. In medium-carbon stainless steel, the carbon level ranges from about 0.31% to about 0.6%. Specific alloy examples can include stainless steel 304/304L (low-carbon), stainless steel GP1 (low-carbon), stainless steel 17-4PH (low-carbon), stainless steel 316/316L (low-carbon), stainless steel 430L (low carbon), titanium 6A14V, and titanium 6AI-4V ELI7. While several example alloys have been provided, it is to be understood that other alloys may be used.

The temperature(s) at which the metal particles sinter together is/are above the temperature of the environment in which the patterning portion of the 3D printing method is performed, e.g., patterning at from about 18° C. to about 100° C. In an example, sintering (which may include de-binding and sintering) takes place at a temperature ranging from about 500° C. to about 3,500° C. In some examples, the metal particles may have a melting point ranging from about 500° C. to about 3,500° C. In other examples, the metal particles may be an alloy having a range of melting points.

The particle size of the metal-based build material can be similarly sized or differently sized. In one example, the D50 particle size of the metal-based build material can range from 0.5 μm to 200 μm. In some examples, the particles can have a D50 particle size distribution value that can range from about 2 μm to about 150 μm, from about 1 μm to about 100 μm, from about 1 μm to about 50 μm, etc. Individual particle sizes can be outside of these ranges, as the "D50 particle size" is defined as the particle size at which about half of the particles are larger than the D50 particle size and about half of the other particles are smaller than the D50 particle size. The particle size may be a volume-weighted mean diameter.

The shape of the particles of the particulate build material can be spherical, non-spherical, random shapes, or a combination thereof.

The metal-based build material may be used alone in a build material composition, or may be used with other additives. Any of the metal-based build material compositions disclosed herein include from about 80 wt % to 100 wt % of the metal-based build material particles (based on the total weight of the composition). In other examples, the metal-based build material particles can be present in the composition in amounts ranging from about 90 wt % to 100 wt %, or from about 95 wt % to 100 wt %, or in an amount of 100 wt %. When the metal particles are present in the build material composition in an amount less than 100 wt %, the remainder of the build material composition may be made up of additives, such as flow aids (e.g., in amounts ranging from about 0.05 wt % to about 0.2 wt %), polymer powder material, etc.

Three Dimensional Printing Methods

In the 3D printing methods disclosed herein, the binder fluid is used to pattern an intermediate structure, and then high temperature heating is used to remove the polymer particles from the structure and sinter the metal-based build material together to form the 3D object. Also in the 3D printing methods disclosed herein, the hardening agent is used to case-harden desirable regions of the 3D object.

FIG. 1 is a flow diagram illustrating examples of the method where the hardening agent is applied to the 3D object after it is formed (as shown in FIG. 3B). Generally, the method 100 includes: based on a 3D object model, patterning individual layers of a metal-based build material with a binding agent to form an intermediate structure (reference numeral 102); heating the intermediate structure to form a 3D object (reference numeral 104); and case-hardening a predetermined depth of at least a portion of the 3D object by cooling the 3D object to a first temperature that is below a vaporization temperature of a hardening agent to be selectively applied to at least a portion of the 3D object; selectively depositing, using an inkjet printhead, the hardening agent to deliver a predetermined concentration of a hardening element to the at least the portion of the 3D object; heating the 3D object at a first rate to a second temperature that aids in diffusion of the hardening element; holding the 3D object at the second temperature for a predetermined time; and cooling the 3D object at a second rate (reference numeral 106).

Figure 2A:
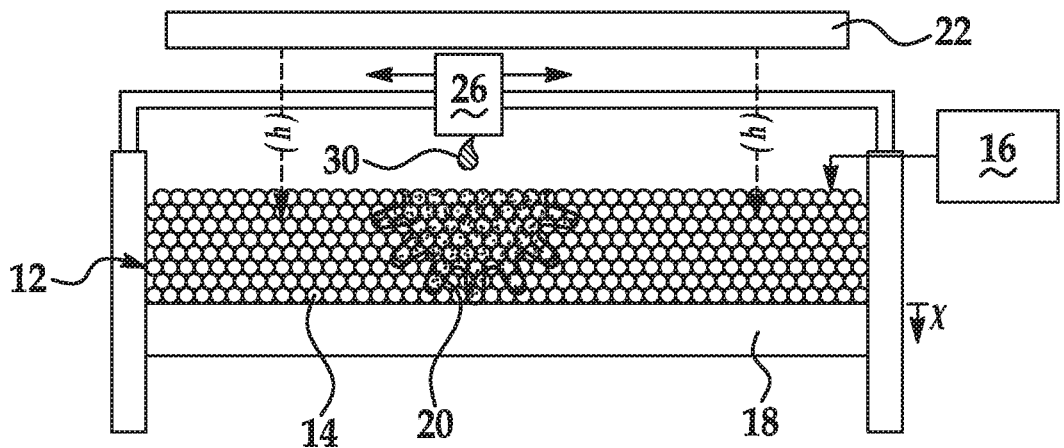
FIGS. 2A and 2B graphically illustrate an example of the method of FIG. 1.
Figure 2B:
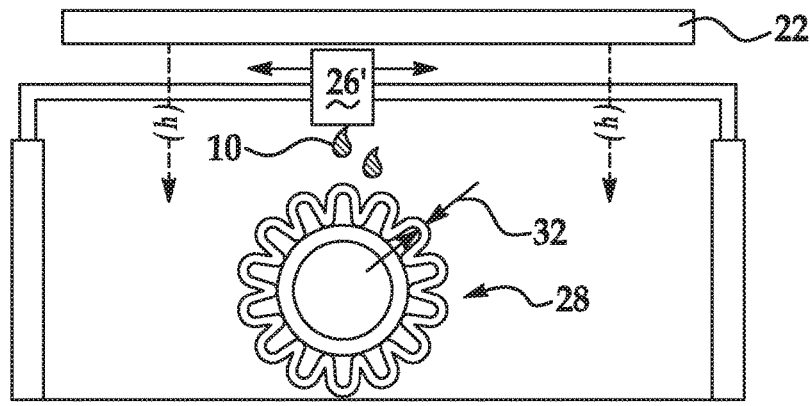

FIGS. 2A and 2B illustrate an example of the 3D printing method 100 where the hardening agent 10 is applied after the 3D object 28 is formed.

As shown in FIG. 2A, the metal-based build material 14 is deposited from a build material source 16 onto a build platform 18 where it can be flattened or smoothed, such as by a mechanical roller or other flattening mechanism or technique. In this example, the binder fluid 30 can be ejected onto the metal-based build material 14 in a particular layer 12 from a fluid ejector 26 (such as a thermal inkjet printhead or a piezoelectric inkjet printhead). The fluid ejector 26 allows for (spatially) selective patterning of the metal-based build material 14 layer by layer. The location(s) of the selective applied binder fluid can be selected to correspond with a layer of a 3D printed object, such as from a 3D object model or computer model. The patterned portion(s) of the layers 12 of the metal-based build material 14 are shown at reference numeral 20. In this example, the binder fluid 30 is being ejected in the pattern of a gear.

Heat (h) can be used, such as from a heat source 22, at the various layers (or group of layers) of the build material 13 to remove water from the binder fluid throughout the patterning process. This temperature is 120° C. or less. In an example, this temperature may range from about 50° C. to about 120° C. In one example, heat can be applied from overhead, e.g., prior to application of the next layer of metal-based build material 14, or after multiple layers are patterned, etc., and/or can be provided by the build platform 18 from beneath the metal-based build material 14 and/or from the build material source 16 (which preheats the metal-based build material 14 prior to dispensing it on the build platform 18 or a previously applied and patterned layer.

After each individual layer 12 is patterned with binder fluid, the build platform 18 can be dropped a distance of (x), which can correspond to at least the thickness of a patterned layer in one example, so that another layer of the metal-based build material 14 can be added thereon and patterned with the binder fluid. The process can be repeated on a layer-by-layer basis until all of the desired layers are patterned in accordance with a 3D object model.

The ejector(s) 26 deposit the binder fluid 30 in a pattern that corresponds to the layers of the 3D object, and can be used to form a 3D intermediate structure in any orientation. For example, the 3D intermediate structure can be printed from bottom to top, top to bottom, on its side, at an angle, or any other orientation. The orientation of the 3D intermediate structure can also be formed in any orientation relative to the layering of the metal-based build material 12. For example, the 3D intermediate structure can be formed in an inverted orientation or on its side relative to the build layering within the metal-based build material 12. The orientation of build or the orientation of the 3D intermediate structure within the metal-based build material 12 can be selected in advance or even by the user at the time of printing, for example.

After all of the desired regions of the layers 12 of metal-based build material 14 are patterned with the binder fluid 30, heating all of the individually patterned layers may be performed. This heating is performed at a temperature ranging from about 120° C. to about 200° C. At this temperature range, heating coalesces the (latex) polymer particles to form a strong polymer film. The cured portions form the 3D intermediate structure (not shown in FIGS. 2A and 2B), and any non-patterned build material 12 surrounding the 3D intermediate structure remains non-cured.

The 3D intermediate structure can then be moved to a heating device, such as a sintering oven. In one example, the heating can be a temperature ranging from about 500° C. to about 3,500° C. At lower temperatures within the range, the network of the polymer particles can thermally degrade, thereby de-binding the 3D intermediate structure, and at the higher temperatures within the range, the metal particles are sintered together. In another example, the de-binding and sintering temperatures can be in the range of from about 600° C. to about 1,500° C., or from about 800° C. to about 1,200° C. The de-binding temperature range can vary, depending on the composition of the network (e.g., polymer particles). The sintering temperature range can vary, depending on the metal particle material. In one example, the sintering temperature can range from about 10° C. below the melting temperature of the metal particles of the particulate build material to about 50° C. below the melting temperature of the metal particles of the particulate build material. In another example, the sintering temperature can range from about 100° C. below the melting temperature of the metal particles of the particulate build material to about 200° C. below the melting temperature of the metal particles of the particulate build material. The sintering temperature can also depend upon the particle size and period of time that heating occurs, e.g., at a high temperature for a sufficient time to cause particle surfaces to become physically merged or composited together. For example, a sintering temperature for stainless steel can be about 1,400° C. Temperatures outside of these ranges can be used as determined on a case by case basis.

In some examples, during heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof.

As shown in FIG. 2B, upon removal of the sintered 3D object 28 from the sintering oven, the 3D object 28 may be placed back onto the build platform 18, or may be placed into another platform, where it can be case-hardened.

During the patterning portion of the case-hardening process, it is desirable for the 3D object 28 to be at a temperature that is below a vaporization temperature of the hardening agent 10. As such, after sintering, the 3D object 28 may be cooled in order to bring the temperature of the 3D object 28 below the vaporization temperature. In some examples, cooling of the 3D object 28 below the vaporization temperature of the hardening agent may occur passively (e.g., allowing the temperature of the 3D object 28 to come down on its own) or actively (e.g., by exposing the 3D object 28 to a cold environment). It is desirable to apply the hardening agent 10 when the 3D object 28 is below the vaporization temperature so that the hardening agent 10 does not evaporate. The vaporization temperature of the hardening agent 10 depends upon the co-solvent(s) in the hardening agent 10, and the boiling point of the co-solvent(s).

In this example of the method 100, portions(s) of the cooled 3D object 28 that are to be case-hardened are then patterned with the hardening agent 10. When the hardening agent 10 is applied, the temperature of the 3D object 28 is maintained below a vaporization temperature of the hardening agent 10.

The hardening agent 10 can be ejected onto the surface of the 3D object 28 in a particular pattern from a fluid ejector 26' (e.g., thermal inkjet ejector, piezoelectric ejector). The fluid ejector 26' enables the hardening agent 10 to be applied to a specific surface location in order to deliver a specified concentration of the hardening element.

The specified concentration of the hardening element may depend, at least in part, upon the concentration of the hardening element in the hardening agent 10, the build material 12 that is used, and the desired penetration depth 32 for the hardening element into the 3D object 28.

Some metal or metal alloy phases have a high solubility for certain hardening elements at certain temperatures. For example, at about 750° C., low- and medium-carbon stainless steels have a high solubility for carbon. Therefore, the concentration of the hardening element that is to be delivered to the 3D object 28 may depend upon the solubility level of the hardening element in the metal-based build material 12. In an example, the desired concentration of the hardening element may be the maximum amount that is able to diffuse into the metal-based build material 12 during a subsequent thermal cycle. In one specific example, from about 0.5 mass percent to about 1.0 mass percent of carbon is soluble in the stainless steel material at about 750° C. This mass percent can be delivered using multiple droplets of the hardening agent per unit area of build material 12. Since the mass percentage of the hardening agent is known per droplet, the number of droplets can be determined that will meet or exceed the solubility limit.

The specific concentration may be dispensed in a single printing pass or over multiple printing passes, and may depend, in part, upon the number of droplets dispensed. In some examples, the method 100 includes controlling the inkjet printhead (fluid ejector 26) to selectively deposit the hardening agent 10 over the number of printing passes. As such, each pass may deliver a fraction of the total desired amount that is to be applied. The number of printing passes may be set based on the predetermined concentration of the hardening element to be delivered, a concentration of the hardening element in the hardening agent 10, a diffusion coefficient of the hardening element, and the predetermined time for diffusion. It is to be understood that several printing passes may be performed sequentially before any heating is performed to initiate diffusion. A pause between printing passes may be desirable to allow the hardening agent 10 to at least partially penetrate the 3D object 28. In one example, the number of printing passes includes an initial printing pass and at least one subsequent printing pass, and wherein the at least one subsequent printing pass replenishes the hardening element at a surface of the at least the portion of the 3D object 28 for thermal diffusion into the predetermined depth 32. By replenishing the hardening agent, one can create a deep case thickness and/or can create a gradient profile of the hardening element throughout the predetermined depth 32. As an example of creating the gradient profile, the concentration delivered at each printing pass (which is a fraction of the total desirable amount) may be increased or decreased (with respect to the previously delivered concentration), and then a gradient of the hardening element will result through the depth 32. In other examples, the same concentration (which is a fraction of the total desirable amount) can be delivered at each printing pass to create a constant and deep profile through the depth 32.

In addition to the number of print passes, other parameters, such as percentage of firing print nozzles, drop weight produced by the printhead, the percent solids of the hardening element in the hardening agent, may affect the concentration of the hardening element that is delivered. Any of these parameters may be adjusted or accounted for to deliver a specific hardening element concentration per unit volume of the metal-based build material 12. The fluid ejector 26' can deliver the amount of the hardening agent 10 to the desirable portion(s) on the surface of the 3D object 28. In the example shown in FIG. 2B, any gear edges and surfaces that experience friction and impact during are treated with the hardening agent 10.

As mentioned, the hardening element may be diffused into the 3D object 28 to a predetermined depth 32. Diffusion takes place during a thermal cycle. As used herein, the "thermal cycle" includes heating, at a first rate, to a temperature that aids in diffusion of the hardening element, holding at the temperature for a predetermined time, and cooling, at a second rate, back to room temperature. When the 3D object 28 is held at the temperature that aids in diffusion of the hardening element and the supply of the hardening agent 10 had been replenished, e.g., through multiple printing passes, thermal diffusion will continue to drive the hardening element into the 3D object 28 to produce a case depth profile.

The predetermined depth 32 may be calculated by solving Fick's second law using the appropriate boundary conditions:

$$\frac{\partial C}{\partial t} = \frac{\partial}{\partial d}\left(D\left(\frac{\partial C}{\partial d}\right)\right)$$

where C is the concentration of the hardening element, D is the diffusion coefficient for hardening element in the metal-based build material, and t and x are the time and distance (into the metal-based build material), respectively. In an example, the diffusion coefficient of carbon into an α-iron-based build material is about $6.2 \times 10^{-7}$ m$^2$/s and into a γ-iron-based build material is about $2.3 \times 10^{-5}$ m$^2$/s at temperatures ranging from about 500° C. to about 1100° C. In another example, the diffusion coefficient of copper into a copper-based build material is $7.8 \times 10^{-5}$ m$^2$/s at a temperature of about 500° C. In still other examples, the diffusion coefficient of copper into a nickel-based build material is $2.7 \times 10^{-5}$ m$^2$/s at a temperature of about 500° C. or into an aluminum-based build material is $6.5 \times 10^{-5}$ m$^2$/s at a temperature of about 500° C.

At solid state diffusion where the hardening element atoms diffuse into the interstitial gaps in between atoms of the metal-based build material, one solution to the diffusion equation is:

$$C_{surf} = \frac{-C_c + C_0 erf\left[\frac{d}{2\sqrt{Dt}}\right]}{erf\left[\frac{d}{2\sqrt{Dt}}\right] - 1}$$

where $C_{surf}$, $C_C$, and $C_0$ are, respectively, the surface concentration of the hardening element, the hardening element concentration as a function of distance, and the initial hardening element concentration in the metal-based build material as a function of distance, d, and time, t, from the surface of the object, at d=0. D is the diffusion coefficient of the hardening element (assumed to be independent of concentration).

The diffusion process may not be a steady state process, such that Fick's Law becomes:

$$\frac{\partial C}{\partial t} = D\frac{\partial^2 C}{\partial d^2}$$

In non-steady state solutions, the diffusion of the hardening element atoms has a spatial and temporal dependence. In this example, the diffusion coefficient may or may not be a function of the initial hardening element concentration. In this example, finite difference methods (such as, e.g., the Crank-Nicolson technique) may be used to model this more complex system.

A diffusion model may be used to determine the carbon surface concentration, temperature, and time required to achieve a desired case depth 32.

Upon deposition of the hardening agent 10 on the surface of the 3D object 28, some of the droplets may infiltrate into the semi-porous matrix of the 3D object 28. If multiple printing passes are used, more of the hardening agent 10 will penetrate into the 3D object 28. The 3D object 28 may then be heated at the first rate to the temperature that aids in diffusion of the hardening element further into the 3D object 28. This temperature may be a temperature at which the metal-based build material 12 (from which the 3D object 28 is built) has a high solubility for the hardening element that is being diffused. In some examples, this temperature is equal to or greater than 700° C. The first rate involves a controlled increase in the 3D object 28 temperature over time until the temperature that aids in diffusion is reached. The first rate may be a rapid increase in temperature or a slow increase in temperature. The rate of the temperature increase may depend, in part, upon the thermal process that is used. For example, rapid thermal annealing may be performed using a photonic heating source or a thermally controlled furnace. As an example of a rapid increase in a controlled furnace, the heating rate may range from about 20° C. per hour to about 200° C. per hour. As another example of a rapid increase in a controlled furnace, the heating rate may range from about 35° C. per hour to about 150° C. per hour. Any heating rate below 20° C. per hour may be considered a slow increase in temperature.

The 3D object 28 may then be held at the temperature a predetermined time. The predetermined time may be any time that is sufficient for diffusing the hardening element to the desired depth 32 in the 3D object 28. The predetermined time may thus depend, in part, upon the diffusion rate of the hardening agent into the 3D object 28 at the particular temperature. In one example, the 3D object 28 may be held at the predetermined temperature for about 40 minutes. During the holding period, the hardening element is attracted to the metal and saturates the metal at the solubility limit. In some of the examples disclosed herein, the diffused hardening element can alloy with the metal, thereby changing the composition of the portion(s) of the 3D object 28.

The method 100 then involves cooling the 3D object 28 at a second rate. In an example, the 3D object 28 may be cooled down to room temperature. The second rate may be a rapid decrease in temperature or a slow decrease in temperature. The rate of the temperature decrease may depend, in part, upon the cooling process that is used. As an example of a rapid decrease in a controlled furnace, the cooling rate may range from about −20° C. per hour to about −200° C. per hour. As another example of a rapid decrease in a controlled furnace, the cooling rate may range from about −35° C. per hour to about −150° C. per hour. Any cooling rate below −20° C. per hour may be considered a slow decrease in temperature. Cooling thermally quenches the 3D object 28. In an example, during thermal quenching, portion(s) of the 3D object 28 that are dominated by the austenitic phase will convert to the martensitic phase with significantly improved wear and fatigue resistance.

As mentioned, the heating, the holding, and the cooling together are a thermal cycle. Some examples of the method include repeating the thermal cycle to create a gradient profile of the hardening element throughout the predetermined depth 32. The additional thermal cycle(s) can drive the hardening element to the desired depth below the surface of the 3D object 28. The multiple printing passes and the multiple thermal cycles may be used together to increase the depth and/or to adjust the carbon concentration gradually as a function of depth below the surface.

When the metal-based build material 12 is a stainless steel, and the hardening element is selected from the group consisting of molybdenum, tungsten, and boron, the method 100 may further include exposing the 3D object 28 to a reducing atmosphere after the case-hardening. The reducing atmosphere may an environment containing a reducing gas. Suitable reducing gases include hydrogen gas, carbon monoxide gas, or inert gases (e.g., argon gas, helium gas, etc.) in combination with a reducing gas. In an example, the reducing gas can reduce the molybdenum salt, tungsten salt, or boron salt into its elemental form or reduce carbon into a carbide.

Figure 3:
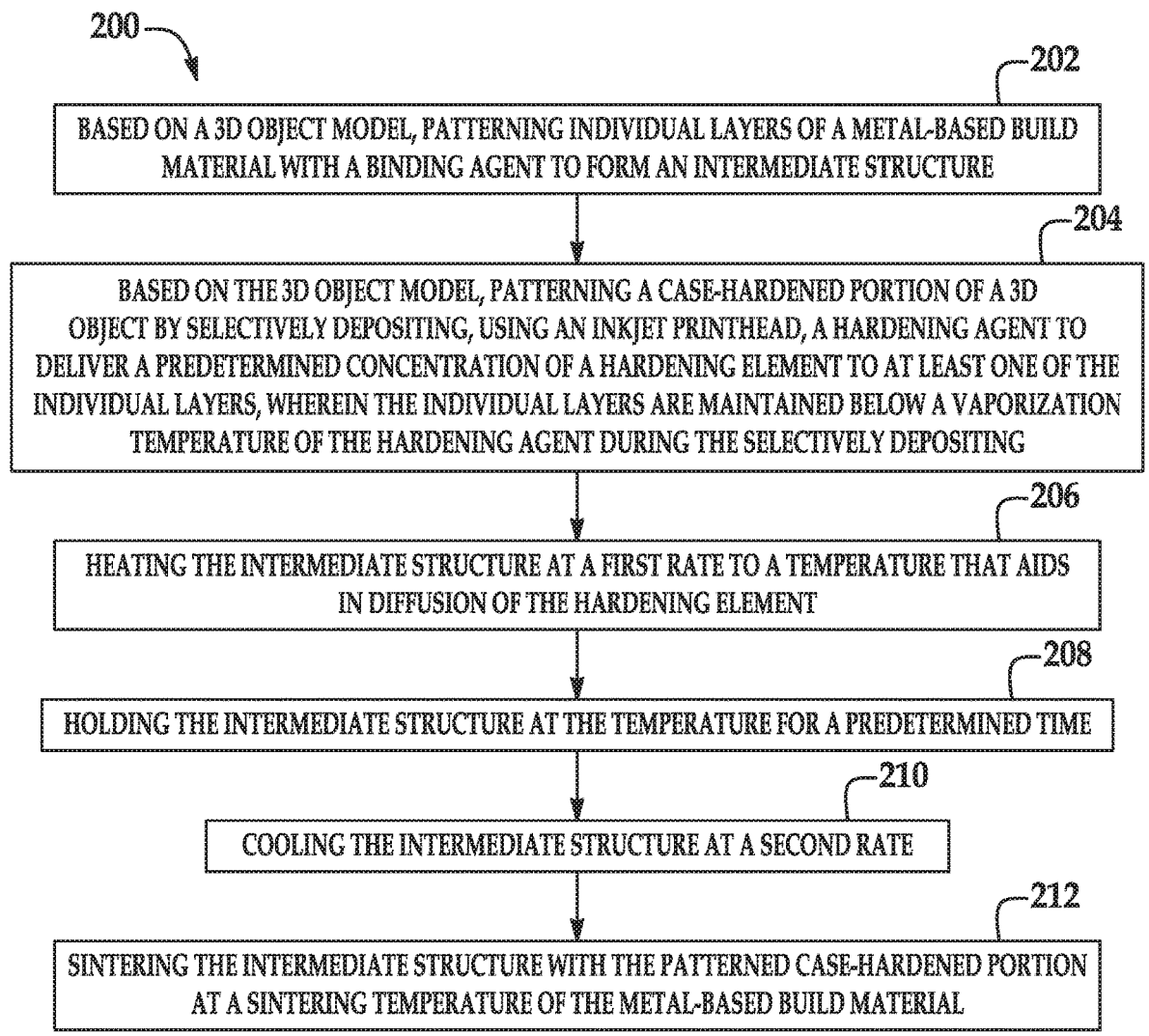
FIG. 3 is a flow diagram illustrating another example method of three-dimensional printing in accordance with the present disclosure.
Figure 4A:
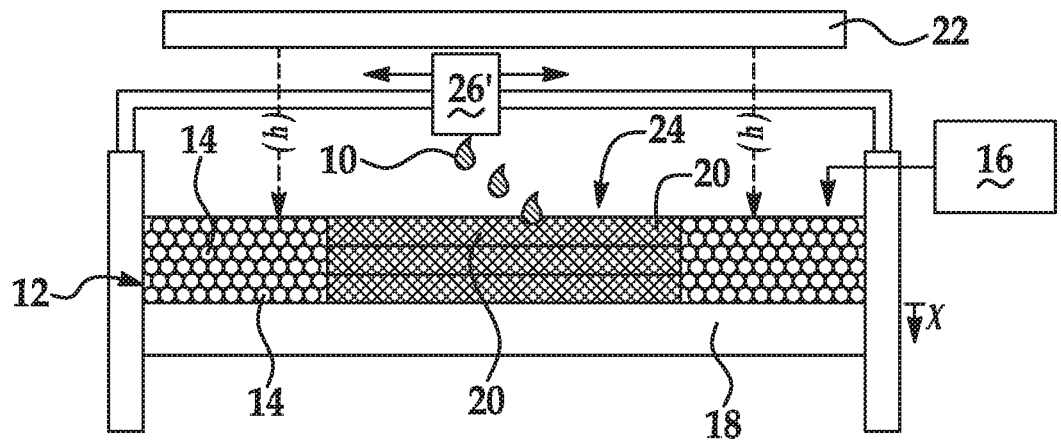
FIGS. 4A and 4B graphically illustrate two different examples of the method of FIG. 3.
Figure 4B:
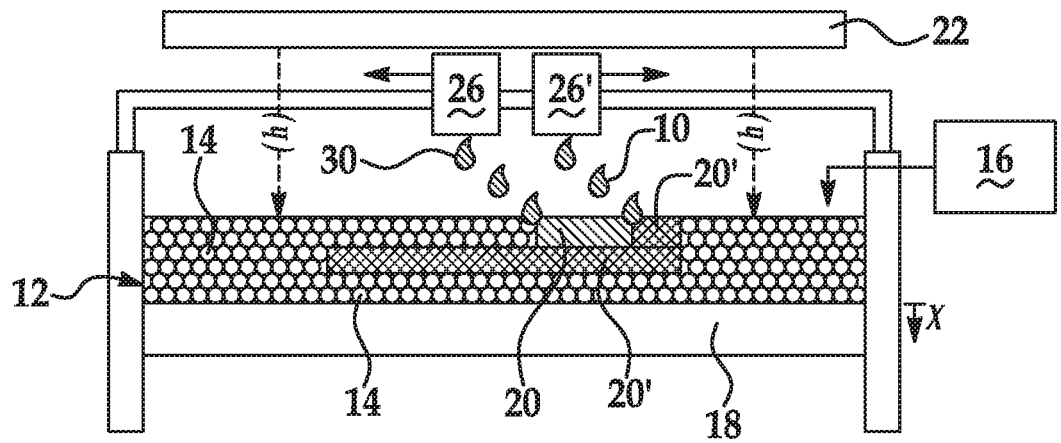

Referring now to FIG. 3, a flow diagram illustrating examples of the method where the hardening agent 10 is applied to the intermediate structure, either after the intermediate structure is built (as shown in FIG. 4A) or as the intermediate structure is being built (as shown in FIG. 4B).

Generally, the method 200 includes: based on a 3D object model, patterning individual layers of a metal-based build material with a binding agent to form an intermediate structure (202); based on the 3D object model, patterning a case-hardened portion of a 3D object by selectively depositing, using an inkjet printhead, a hardening agent to deliver a predetermined concentration of a hardening element to at least one of the individual layers, wherein the individual layers are maintained below a vaporization temperature of the hardening agent during the selectively depositing (reference numeral 204); heating the intermediate structure at a first rate to a temperature that aids in diffusion of the hardening element (reference numeral 206); holding the intermediate structure at the temperature for a predetermined time (208); cooling the intermediate structure at a second rate (210); and sintering the intermediate structure with the patterned case-hardened portion at a sintering temperature of the metal-based build material (212).

FIG. 4A illustrates an example of the 3D printing method 200 where the hardening agent 10 is applied after the intermediate structure 24 is formed by patterning the individual layers 12 of the metal-based build material 14 with the binder agent 30 (not shown in FIG. 4A). As such, in this example of the method 200, the predetermined concentration of the hardening element is delivered to the outermost one of the individual layers 12 after it has been patterned with the binder agent 30. Similar to the method 100 described herein, this example of the method 200 is suitable for case-hardening at the surface, and into a predetermined depth, of the 3D object that is ultimately formed.

In this example, the metal-based build material 14 is deposited from a build material source 16 onto the build platform 18 as described in reference to FIG. 2A. Each layer 12 is patterned with the binder fluid 30 as described in reference to FIG. 2A. After each individual layer 12 is patterned with the binder fluid 30, the build platform 18 can be dropped a distance of (x), which can correspond to at least the thickness of a patterned layer in one example, so that another layer 12 of the metal-based build material 14 can be added thereon and patterned with the binder fluid 30. The process can be repeated on a layer-by-layer basis until all of the desired layers are patterned in accordance with a 3D object model. Heat (h) can be used (as described in reference to FIG. 2A) at the various layers (or group of layers) to remove water from the binder fluid throughout the patterning process.

After all of the desired regions of the layers 12 of metal-based build material 14 are patterned with the binder fluid 30, heating all of the individually patterned layers may be performed. This heating is performed at a temperature ranging from about 50° C. to about 200° C. At this temperature range, heating coalesces the (latex) polymer particles to form a strong polymer film. The cured portions form the 3D intermediate structure 24, and any non-patterned build material 12 surrounding the 3D intermediate structure 24 remains non-cured.

In this example of the method 200, portions(s) of the intermediate structure 24 that are to be case-hardened are then patterned with the hardening agent 10. When the hardening agent 10 is applied, it is desirable for the intermediate structure 24 to be at a temperature that is below a vaporization temperature of the hardening agent 10. As such, after patterning, the intermediate structure 24 may be cooled in order to bring the temperature of the intermediate structure 24 below the vaporization temperature. If the intermediate structure 24 is already below the vaporization temperature, cooling may not take place. As mentioned, it is desirable to apply the hardening agent 10 below the vaporization temperature so that the vehicle of the hardening agent 10 does not evaporate.

The hardening agent 10 can be ejected onto the surface of the intermediate structure 24 (e.g., the outermost layer of patterned build material) in a particular pattern from a fluid ejector 26' (e.g., thermal inkjet ejector, piezoelectric ejector). The fluid ejector 26' enables the hardening agent 10 to be applied to a specific surface location in order to deliver a specified concentration of the hardening element.

The specified concentration of the hardening element may be determined as described herein. The intermediate structure 24 is more porous than the 3D object 28, and thus the droplets containing the hardening element are able to better infiltrate into the porous matrix of the intermediate structure 24. The hardening element becomes trapped in the voids and interstices of the metal-based build material 12 as/after the hardening agent vehicle evaporates. The hardening element will diffuse during the heating and holding portions of the thermal cycle, and may further diffuse during sintering. As such, in the examples of the method 200, the specified concentration of the hardening element may be adjusted to compensate for the additional diffusion. For example, modeling and/or calibration may be used to determine quantitative information about the hardening element distribution at different initial concentrations, heating temperatures, and hold times.

In this example of the method 200, the inkjet printhead (e.g., fluid ejector 26') may be controlled as described herein to selectively deposit the hardening agent 10 over a single printing pass or over multiple printing passes as described herein.

The intermediate structure 24 may then be exposed to the thermal cycle. The intermediate structure 24 is heated at a first rate to a temperature that aids in diffusion of the hardening element further into the intermediate structure 24. This temperature may be a temperature at which the metal-based build material 12 has a high solubility for the hardening element that is being diffused. The first rate involves a controlled increase in the intermediate structure 24 temperature over time until the temperature that aids in diffusion is reached. The first rate may be a rapid increase in temperature or a slow increase in temperature.

In these examples, de-binding of the intermediate structure 24 may be initiated when the intermediate structure 24 is heated to the temperature. Whether de-binding is initiated will depend upon the polymer particles used in the binding agent 30.

The intermediate structure 24 may then be held at the temperature a predetermined time. The predetermined time may be any time that is sufficient for diffusing the hardening element to the desired depth 32 in the intermediate structure 24. The predetermined time may thus depend, in part, upon the diffusion rate of the hardening agent into the intermediate structure 24 at the particular temperature. In one example, the 3D object 28 may be held at the predetermined temperature for about 40 minutes. In some of the examples disclosed herein, the diffused hardening element can saturate the metal-based build material 12 at the solubility limit and/or can alloy with the metal-based build material 12.

The thermal cycle method 200 then involves cooling the intermediate structure 24 at a second rate. In an example, the intermediate structure 24 may be cooled down to room temperature. The second rate may be a rapid decrease in temperature or a slow decrease in temperature.

Some examples of the method 200 include repeating the thermal cycle to create a gradient profile of the hardening element throughout the predetermined depth 32. The additional thermal cycle(s) can drive the hardening element to the desired depth below the surface of the intermediate structure. The multiple printing passes and the multiple thermal cycles may be used together to increase the depth and/or to adjust the carbon concentration gradually as a function of depth below the surface.

After a desirable number of thermal cycles have been performed, the 3D intermediate structure 24 can then be moved to a heating device, such as a sintering oven. Sintering may be performed as described herein to generate the 3D object 28. In this example, the resulting object 28 has at least a portion of which is case-hardened. When the metal-based build material 12 is a stainless steel, and the hardening element is selected from the group consisting of molybdenum, tungsten, and boron, the method 200 may further include performing the sintering in a reducing atmosphere.

The example of the method 200 shown in FIG. 4B is similar to the example shown in FIG. 4A, except that the hardening agent 10 is selectively applied during the formation of the intermediate structure 24 rather than after the intermediate structure 24 is formed. Unlike the method 100 and the method 200 described in FIG. 4A, this example of the method 200 is suitable for case-hardening at desirable portions throughout the 3D object that is ultimately formed. In the example shown in FIG. 4B, the hardening agent 10 may be applied wherever it is desirable for the 3D object to be case hardened. This example of the method 200 may be desirable because it enables the ability to tailor the concentration of hardening element for each layer 12 and to apply the hardening element in particular portion(s) of individual layer(s) 12. The layer-by-layer process may be particularly suitable for hardening out-of-plane surfaces (such as the vertical surfaces of a gear tooth) in a straightforward manner. Moreover, in the example shown in FIG. 4B, the applicator(s) 26, 26' is/are not exposed to high temperatures because the heating for diffusion and the heating for sintering take place after the intermediate structure is formed.

Layer-by-layer patterning with the hardening agent also enables one to create a gradient in the hardness profile through the 3D object 28. In one example of the layer-by-layer process, several layers 12 are patterned with the binder fluid 30, and then the outermost layers (e.g., the last 3-10 layers) are patterned with both the hardening agent 10 and the binder fluid 30. This technique may be used to achieve a deeper case thickness than the example method 200 described in reference to FIG. 4A.

In an example, one or more portion(s) 20' of one or more of the individual build material layer(s) 12 is/are patterned with both the binder fluid 30 and the hardening agent 10. The fluid 30 and agent 10 may be applied sequentially in the same pass of the fluid ejectors 26, 26' or in separate passes of the fluid ejectors 26, 26'. In FIG. 4B, the portion 20 has been patterned with the binder fluid 30, and as shown, is being patterned with the hardening agent 10. Other portions 20 may be patterned with the binder fluid 30 but not the hardening agent 10.

In this example, another build material layer 12 may be applied on the previously patterned layer. The processes of patterning with the binder fluid 30 and (where desirable) the hardening agent 10, may be repeated with this additional build material layer. Patterning may be repeated for each layer that is to be included in the intermediate structure 24.

After all of the layers 12 are patterned with the binder fluid 30 and (where desirable), the hardening agent 10, the intermediate structure 24 is formed. The intermediate structure may then be exposed to the thermal cycle as described in reference to FIG. 4A. More specifically, the intermediate structure 24 may be heated to the diffusion temperature, held at the diffusion temperature, and then cooled back to a temperature that is at least below the vaporization temperature of the hardening agent 10.

After a desirable number of thermal cycles, the 3D intermediate structure 24 can then be moved to a heating device, such as a sintering oven. Sintering may be performed as described herein to generate the 3D object 28. In this example, the resulting object 28 has case-hardened portions in selected layers 12. When the metal-based build material 12 is a stainless steel, and the hardening element is selected from the group consisting of molybdenum, tungsten, and boron, the method 200 may further include performing the sintering in a reducing atmosphere.

As described herein, the example methods 100, 200 relate to binary diffusion, where a single hardening element is diffused into the metal-based build material 12. However, it is to be understood that in any of the example methods 100, 200, multiple hardening agents 10 may be selectively applied to the same portion(s)/regions(s). As such, examples of the method 100, 200 may further include selectively depositing, using a second inkjet printhead, a second hardening agent to deliver a second predetermined concentration of a second hardening element to the at least the portion of the 3D object 28, or the at least the portion of the individual layer 12, or the at least the portion of the intermediate structure 24.

The use of multiple hardening agents 10 enables the diffusion of multiple hardening elements into the 3D object 28. For example, ternary diffusion may be achieved when two different hardening agents (with different hardening elements) are applied. As a specific example, it may be desirable to dope a stainless steel build material with both carbon and chromium. For ternary mixtures, the interactions between each component will influence the overall flux of the diffusing components.

As mentioned herein, the one or more hardening agents 10 may be selected to form an alloy in or at the surface of the 3D object 28. The hardening element(s) and metal-based build material 12 may be selected so that a desirable alloy is formed at desirable region(s) of the 3D object 28, and if desirable, at controlled case depth(s) 32. In an example, different alloys can be generated on the surface of a 3D object 28, where the areal and depth profiles of each alloy are controlled by the methods 100, 200 disclosed herein.

It is to be understood that the ranges provided herein include the stated range and any value or sub-range within the stated range, as if such values or sub-ranges were explicitly recited. For example, from about 0.5 wt % to about 5.5 wt % should be interpreted to include not only the explicitly recited limits of from about 0.5 wt % to about 5.5 wt %, but also to include individual values, such as about 0.85 wt %, about 2.9 wt %, about 5.2 wt %, etc., and sub-ranges, such as from about 0.9 wt % to about 5 wt %, from about 1 wt % to about 4 wt %, from about 0.75 wt % to about 3.75 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional printing, comprising:
based on a 3D object model, patterning individual layers of a metal-based build material with a binding agent to form an intermediate structure;
heating the intermediate structure to form a 3D object; and
case-hardening a predetermined depth of at least a portion of the 3D object by:
cooling the 3D object to a first temperature that is below a vaporization temperature of a hardening agent to be selectively applied to at least a portion of the 3D object;
selectively depositing, using an inkjet printhead, the hardening agent to a surface of the 3D object to deliver a predetermined concentration of a hardening element to the at least the portion of the 3D object;
heating the 3D object at a first rate to a second temperature that aids in diffusion of the hardening element;
holding the 3D object at the second temperature for a predetermined time; and
cooling the 3D object at a second rate.

2. The method as defined in claim 1 wherein the heating, the holding, and the cooling together are a thermal cycle, and wherein the method further comprises repeating the thermal cycle to create a gradient profile of the hardening element throughout the predetermined depth.

3. The method as defined in claim 1 wherein:
the metal-based build material is a stainless steel, and the hardening element is selected from the group consisting of molybdenum, tungsten, and boron; and
after the case-hardening, the method further comprises exposing the 3D object to a reducing atmosphere.

4. The method as defined in claim 1, further comprising selectively depositing, using a second inkjet printhead, a second hardening agent to deliver a second predetermined concentration of a second hardening element to the at least the portion of the 3D object.

5. The method as defined in claim 1 wherein one of:
the metal-based build material is a stainless steel, and the hardening element is selected from the group consisting of carbon, molybdenum, tungsten, copper, and boron; or
the metal-based build material is titanium, and the hardening element is gold.

6. The method as defined in claim 5 wherein the metal-based build material is the stainless steel and wherein the second temperature is an austenitic temperature of the stainless steel.

7. The method as defined in claim 1, further comprising controlling the inkjet printhead to selectively deposit the hardening agent over a number of printing passes.

8. The method as defined in claim 7, further comprising setting the number of printing passes based on the predetermined concentration of the hardening element to be delivered, a concentration of the hardening element in the hardening agent, a diffusion coefficient of the hardening element, and the predetermined time.

9. The method as defined in claim 7 wherein the number of printing passes includes an initial printing pass and at least one subsequent printing pass, and wherein the at least one subsequent printing pass replenishes the hardening element at a surface of the at least the portion of the 3D object for thermal diffusion into the predetermined depth.

\* \* \* \* \*